United States Patent Office 3,323,439
Patented June 6, 1967

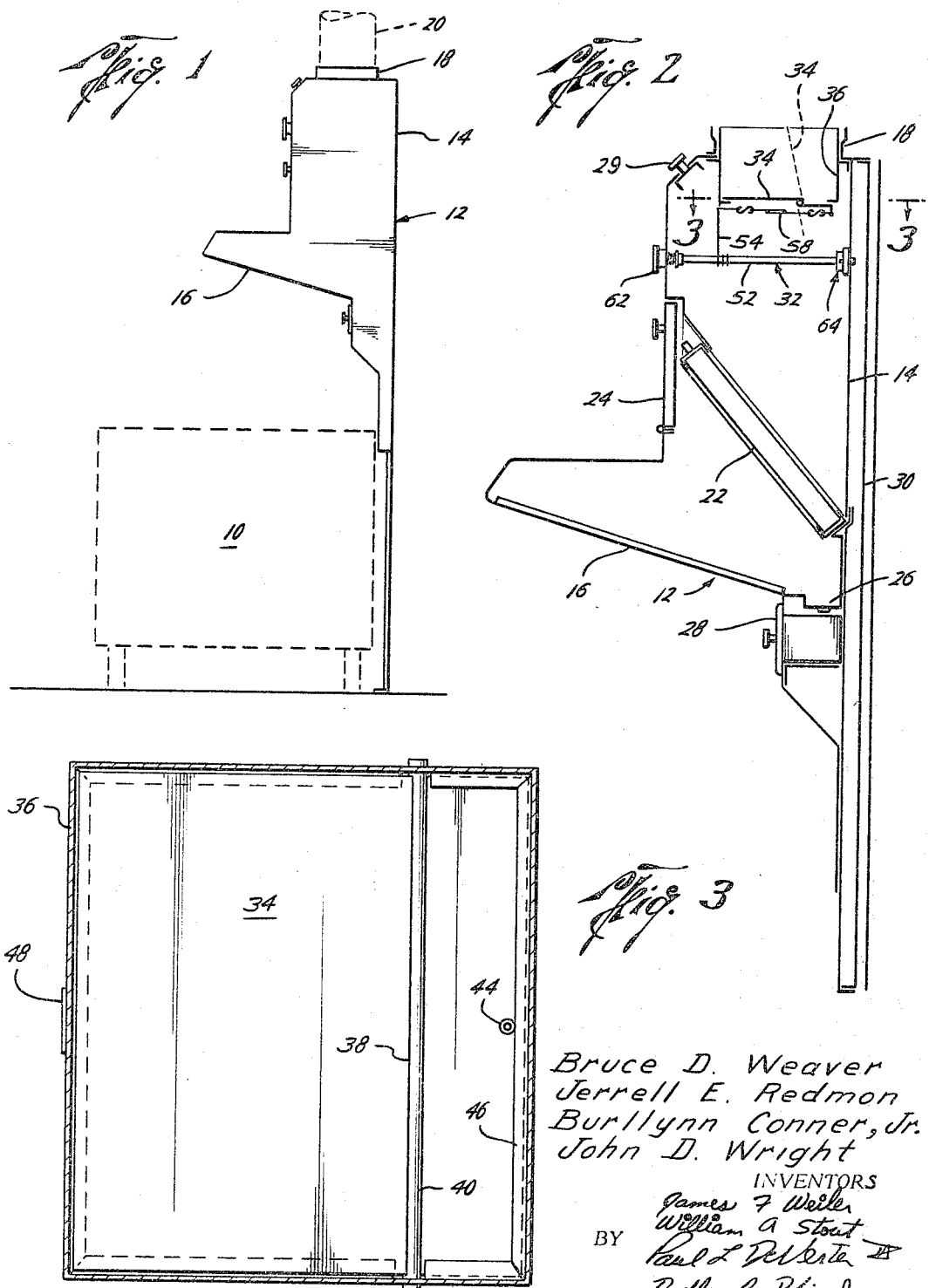

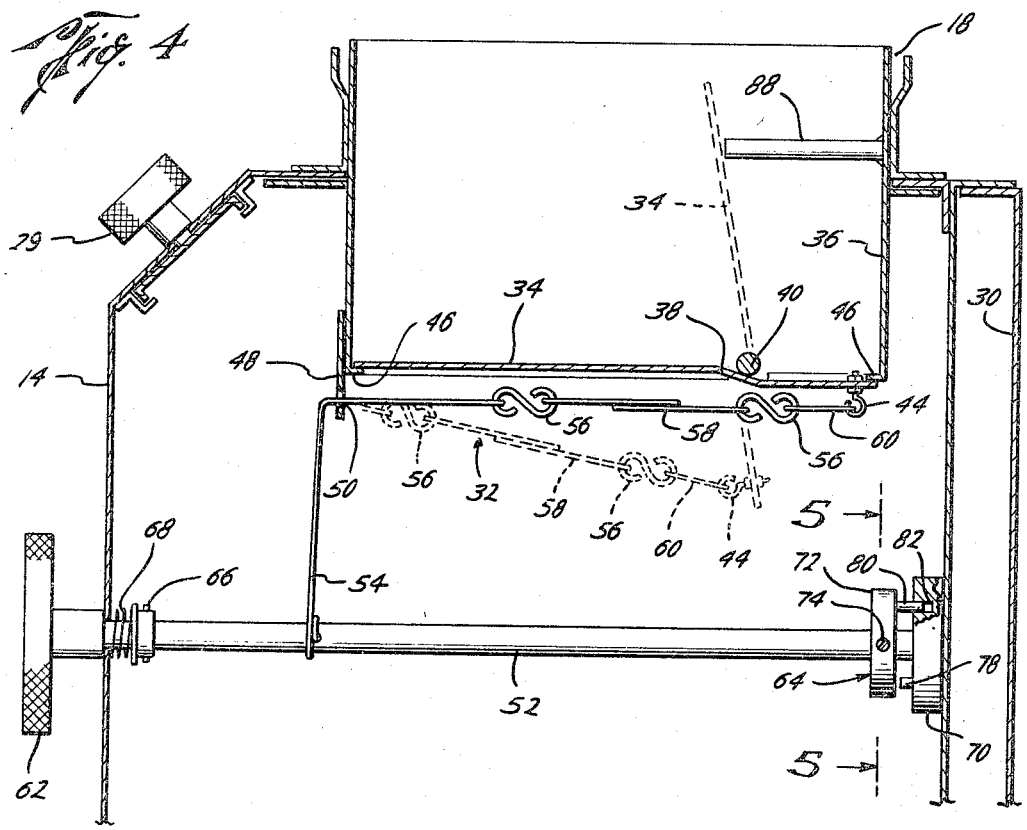
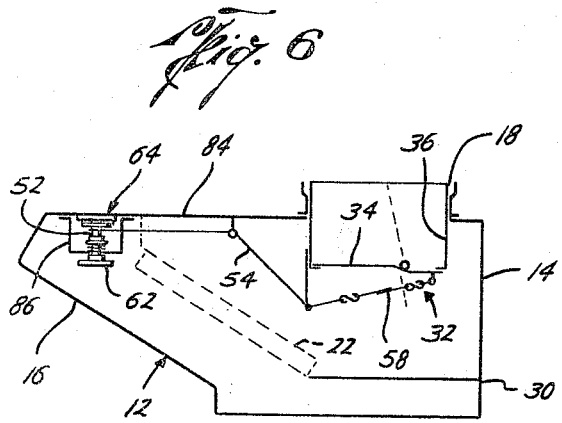
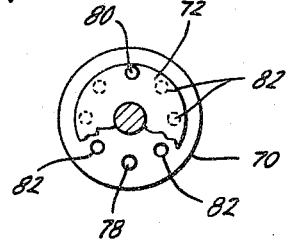

3,323,439
DAMPER AND FIRE CONTROL DEVICE FOR VENTILATORS
Bruce D. Weaver, Box 7786, Houston, Tex. 77007, and Jerrell E. Redmon, Burllynn Conner, Jr., and John D. Wright, all of Houston, Tex.; said Redmon, said Conner, and said Wright assignors to said Weaver
Filed Jan. 28, 1966, Ser. No. 523,604
6 Claims. (Cl. 98—115)

The present invention relates to ventilators or range hoods for use with various cooking devices, and more particularly to a damper and fire control device for use with such a ventilator.

The use of dampers with ventilators for cooking devices is well known and provides a convenient means for regulating the volume of air being sucked through a range hood or ventilator. It is often necessary to regulate this air to regulate the kitchen temperature, to remove grease laden air, or to remove unwanted odors. Often such dampers are fitted with devices so as to automatically close the damper should a fire occur, thus preventing the spread of the fire and preventing its being introduced into the ductwork system. Patents generally depicting such devices are Nos. 2,813,477 and 3,060,833.

It is a general object of the present invention to provide an improved damper and fire control device for ventilators.

It is a further object of the present invention to provide improved damper control means for use with ventilators, which control means includes positive detents for positioning of the damper in various positions, without impairing the fire control feature thereof.

A still further object of the present invention is to provide an improved damper control means which will not be dislodged by vibration of the ventilator itself.

Other and further objects, features and advantages will be apparent from the following description of presently-preferred embodiments of the invention, given for the purpose of disclosure, taken in conjunction with the accompanying drawings, where like character references designate like parts throughout the several views, and where:

FIGURE 1 is a general side view showing a typical ventilator and its position with respect to a cooking device.

FIGURE 2 is a sectional side view, enlarged from that of FIGURE 1,

FIGURE 3 is a partial sectional view taken along the line 3—3 of FIGURE 2,

FIGURE 4 is a partial sectional side view, enlarged from that of FIGURE 2, and particularly showing the damper control means, FIGURE 5 is a sectional view taken along the line 5—5 of FIGURE 4, and FIGURE 6 is a sectional side view of a modified form of the invention.

The invention generally comprises a damper control means which includes a pivotal damper door, an actuating cable, a fusible link, and a vibration proof and positive positioning means for setting the damper door, to provide a damper and fire control device for ventilators.

Referring now to the drawings, reference numeral 10 generally designates a range, stove, oven, deep fat fryer or other cooking device, such as might be found in a restaurant or other kitchen. Suitably mounted above and behind the cooking device is a ventilator 12 which generally includes a rectangular conduit portion 14, a hood 16 leading to the conduit 14, and forming an inlet for air to be exhausted, and a transition piece 18, mounted above the conduit 14 and leading in a conventional manner to appropriate ducts and exhaust fans 20.

As seen in FIGURE 2, mounted within the conduit 14 upstream from the hood 16 is an appropriate filter 22 which may be removed from the conduit 14 through an access door 24 located over the hood. Mounted beneath the filter 22 is a grease collecting trough 26 which drains into a grease receptacle 28. The back wall 30 of the ventilator 12 is here shown of double-wall construction, so as to insulate the ventilator from any building or structural walls, and also to help control air flow through the ventilator. If desired, secondary air control device 29 may be placed in the upper portion of the conduit.

Situated in the upper portion of the conduit 14 is the damper and fire control device 32 which generally consists of a damper door 34 pivotally mounted in a rectangular duct 36, a fusible link 58, a cable 54, a rotatable and axially movable shaft 52, the shaft having a knob 62 at one end and a detent means 64 at the other. As will become apparent hereinafter, rotation of the knob 62 will result in pivoting the damper door 34 from the closed position, to the fully open position shown in dotted lines.

Referring now to FIGURES 3 and 4, the damper door 34 generally includes a rectangular plate which fits within the rectangular duct 36 and includes an off-set portion 38 spaced from the center thereof. Along the top of the off-set portion 38 there is fastened to the door 34 a shaft 40 which rotates in holes, or other appropriate journals in the duct 36. Extending downwardly from the door 34 is an eye 44, which is attached to the door 34 in any convenient manner. It is now apparent that pulling upon the eye 44 will result in pivoting the door 34 about the shaft 40, thus moving the door 34 to the position shown in dotted lines in FIGURES 2 and 4.

With particular reference to FIGURE 4, it is seen that the off-set 38 of the door 34 is just enough so that the upper portion of the door 34 rests on a ledge 46 of the duct 36 on one side, and bears upwardly against the corresponding ledge 46 on the other side of the duct 36. As seen in FIGURE 3, the width of the door 34 is just slightly less than the width of the duct 36, hence when the door 34 is closed, the duct 36 is essentially sealed. Because the off-set 38 is situated well to one side of the center of door 34, and because the upper portion of the door comprises the larger weight, the door 34 is biased to remain closed, sealing the duct 36, unless means are undertaken to pivot the door.

Formed in a suitable bracket 48 attached to the duct 36 is an eyelet 50, and journaled therebeneath in the conduit 14 is the shaft 52. Suitably attached to the shaft 52 is a cable 54 which runs through the eyelet 50 to a hook 56. Attached to the other end of the hook 56 is a fusible link 58. Similarly attached to the other end of the fusible link 58 is another hook 56 which is connected by a small cable 60 to the eye 44. It is now apparent that rotation of the shaft 52 will result in winding up and pulling the cable 54 which in turn will pivot the door 34 about the shafts 40 through the pull on the eye 44. When this is done, the various parts will move to the position shown in dotted lines in FIGURE 4. The fusible link is a standard commercial item which typically comprises two pieces of metal bonded with a low melting point solder to make a temperature sensitive element. Thus, when the fusible link reaches a pre-determined temperature, such as 360° F., the solder becomes fluid and the link separates, and in accordance with the present invention, the door 34 closes because of the placement of its fulcrum and the unbalance of weights. Obviously, any other desired temperature for the fusible link 58 might be utilized. Preferably the fusible link is situated under the damper door.

The shaft 52 is both rotatable and axially movable. The shaft 52 includes a knob 62 suitably mounted on one end, outside of the conduit 14 and a detent means 64 at the other end of the conduit. Mounted within the conduit 14 on the shaft 52 is a thrust member 66 and situated between this thrust member 66 and the conduit 14 is a spring 68 which yieldingly urges the shaft 52 toward the rear of the conduit 14. Therefore, the axial movement of the shaft 52 is limited by a knob 62 and the thrust member 66.

The detent means 64 generally comprises a first disk 70 attached to the rear wall of the conduit 14 and into which the shaft 52 extends so that it may be axially moved and rotated, a second disk 72 suitably attached to the shaft 52, as by the set screw 74, a stop in 78, and a locating pin 80. With particular reference to FIGURE 5, it is seen that rotation of the disk 72 is limited because the locating pin 80 will engage the stop pin 78 extending from the disk 70. The disk 70 includes a suitable number of locating holes 82 therein. Thus, when the knob 62 is pulled outwardly, the shaft 52 is moved axially, and the locating pin 80 is pulled out of the locating hole 82, whereupon the knob 62 and shaft 52 may be rotated to another desired position and the shaft located in that position by re-engaging the locating pin 80 with the appropriate locating hole 82. The spring 68 serves to urge the disks together.

In this manner, a damper control means for use with ventilators is provided which includes positive detents for positioning the damper in various positions, and which control means will not be dislodged by vibration of the ventilator itself.

It is to be further noted that the operation of the fusible link 58 is not impaired, and consequently should a grease fire occur on the cooking unit 10, and should the heat become excessive, so that the fusible link separates, the position of the detent mechanism 64 will not affect the automatic closing of the damper door 34, thus preventing the fire from being sucked up the ducts, and cutting off further oxygen supply from this particular ventilator to the duct system.

The particular placement of the stop pin 78 and locating pin 80 is designed to prevent rotating the shaft 52 to such an extent that the door 34 is pulled over the point where it will fully close the duct 36 when released. A positive stop stob 88 may also be provided for this purpose.

Referring now to FIGURE 6, a modified version of the invention is seen applied to the slightly differently physically shaped ventilator 12. Corresponding parts have been given identical numbers, and it should be noted that the shaft 52 has been mounted vertically instead of horizontally.

Instead of the shaft 52 extending from the front to the rear walls of the conduit 14, as seen in FIGURE 4, it is mounted between the top wall 84 of the hood 16 and a bracket 86 extending downwardly therefrom. The remainder of the damper fire control device is as previously discussed, and in FIGURE 6 the filter 22 and some of its associated baffles are shown generally in dotted lines to avoid confusion.

In use, the damper door 34 is adjusted to provide the desired draft over the cooking unit 10 by axially moving and rotating the knob 62 as desired. Should a fire occur, such that the fusible link 58 separates, the damper door 34 will automatically close, thus preventing further oxygen entering the duct from the ventilator, and preventing the fire from being sucked therein.

Thus, it is seen that the present invention has advantageously provided a damper and fire control device for use with ventilators which is unaffected by vibration and which may be positively positioned without affecting the fire control portion thereof.

The present invention, therefore, is well adapted to carry out the objects and attain the ends and advantages mentioned, as well as others inherent therein. While presently preferred embodiments of the invention have been given for the purpose of disclosure, numerous changes in the details of construction, and the combination, shape, size, arrangement of parts and uses may be resorted to without departing from the spirit and scope of the invention as hereinafter claimed.

What is claimed is:
1. In a ventilator for use with cooking devices:
   a conduit,
   a hood extending from the conduit and situated generally over the cooking device,
   a duct extending downwardly within the conduit through which cooking odors are exhausted,
   the duct having ledges on the front and back thereof,
   a damper door pivotally mounted in the duct,
   the door including an offset at one side thereof so that one portion will rest on one ledge of the duct and the other portion will bear on the other ledge of the duct,
   the weight of the door and placement of the pivotal mounting being such that the door normally closes the duct,
   a rotatable and axially movable shaft mounted in the ventilator,
   a cable attached to the shaft and extending to that portion of the damper door bearing on the duct,
   a fusible link incorporated in the cable,
   an operating knob extending from a first end of the shaft, and
   detent means to hold the shaft in predetermined positions on a second end of the shaft,
   whereby rotation of the shaft will adjust the extent of opening of the damper door.

2. The invention of claim 1 wherein the detent means holds the shaft in response to axial positioning of the shaft.

3. The invention of claim 2 wherein the detent means includes:
   a first disk mounted on the ventilator with the second end of the shaft passing therethrough,
   a second disk mounted on the shaft adjacent the first disk,
   a series of locating holes in the first disk radially spaced from the shaft,
   a locating pin extending from the second disk insertable in each hole upon axial and rotational movement of the disk and shaft, and
   means yieldingly urging the disks together.

4. The invention of claim 3 including:
   a stop pin extending from the first disk at the same radius as the locating pin on the second disk,
   thereby creating a stop point and limiting rotational movement of the shaft.

5. In a ventilator for cooking devices which includes a pivotal damper door biased in a normally closed position and a cable which when pulled opens the door, the improvement including:
   a rotatable and axially movable shaft,
   the cable attached to the shaft and door and arranged to be pulled upon rotation of the shaft,
   a fusible link incorporated in the cable,
   an operating knob extending from a first end of the shaft,
   a first disk mounted on the ventilator with the second end of the shaft journaled therein,
   a second disk mounted on the shaft adjacent the first disk,
   a series of locating holes in the first disk radially spaced from the shaft,
   a locating pin extending from the second disk insertable in each hole upon axial and rotational movement of the disk and shaft, and
   means yieldingly urging the disks together.

6. The invention of claim 5 including:
   a stop pin extending from the first disk at the same radius as the locating pin on the second disk,
   thereby creating a stop point and limiting rotational movement of the shaft.

(References on following page)

References Cited

UNITED STATES PATENTS

| | | | |
|---|---|---|---|
| 2,862,437 | 12/1958 | Smith et al. | 98—86 X |
| 3,055,285 | 9/1962 | Gaylord | 98—86 X |
| 3,060,833 | 10/1962 | Pledger | 98—115 |
| 3,065,687 | 11/1962 | Graswich et al. | 98—115 |
| 3,283,691 | 11/1966 | Reiter | 98—86 X |

ROBERT A. O'LEARY, *Primary Examiner.*

M. A. ANTONAKAS, *Assistant Examiner.*